US006415219B1

(12) United States Patent
Degodyuk

(10) Patent No.: US 6,415,219 B1
(45) Date of Patent: Jul. 2, 2002

(54) TECHNIQUE OF REAL-TIME TRACKING AND MANAGEMENT OF LAND-BASED VEHICLES OF THE AIRPORT

(75) Inventor: Valeriy Vasilyevich Degodyuk, Moscow (RU)

(73) Assignee: Zakrytoye East Line-Handling, Domodedoxo (RU)

( * ) Notice: Subject to any disclaimer, the term of this patent is extended or adjusted under 35 U.S.C. 154(b) by 0 days.

(21) Appl. No.: 09/702,775

(22) Filed: Nov. 1, 2000

(30) Foreign Application Priority Data

Dec. 21, 1999 (RU) .......................................... 99126409

(51) Int. Cl.[7] .......................... G08B 29/00; G01S 13/00

(52) U.S. Cl. ....................... 701/117; 701/117; 701/120; 701/207; 701/211; 340/539; 340/945; 340/531; 340/995; 342/357

(58) Field of Search ................................ 701/117, 120, 701/208, 200–207, 211; 342/357; 74/604; 175/298; 455/66, 430; 340/506, 539, 945, 825.72, 531, 990, 996, 995

(56) References Cited

U.S. PATENT DOCUMENTS 2,070,315 A 2/1937 Rawlins et al. ............. 175/298
2,095,757 A 10/1937 Lundquist et al. ............ 74/604
5,600,329 A 2/1997 Brenner ....................... 342/357
5,867,804 A 2/1999 Pilley et al. ................ 701/120
6,246,320 B1 * 6/2001 Monroe ....................... 340/506
6,253,064 B1 * 6/2001 Monroe ....................... 455/66
6,266,614 B1 * 7/2001 Alumbaugh ................ 701/211
6,278,939 B1 * 8/2001 Robare et al. .............. 701/208

* cited by examiner

*Primary Examiner*—William A. Cuchlinski, Jr.
*Assistant Examiner*—Tuan C To
(74) *Attorney, Agent, or Firm*—Jacobson Holman, PLLC

(57) ABSTRACT

The invention relates to the field of management of land-based vehicles on the airport territory using satellite positioning technologies.

The technique of real-time tracking and management of land-based vehicles of the airport includes creation of a geoinformation system of the airport territory, real-time determination of coordinates of vehicles using satellite positioning devices, control of speed and/or routes of vehicle movement and management of vehicle traffic. Additionally, state of vehicles and/or time of execution of works by each vehicle are controlled and movement of and execution of works by vehicles in accordance with time technological schedules of postflight servicing of aircrafts on the basis of daily plans of flights is handled. The geoinformation system of the airport territory is formed in the two-dimensional coordinates, and coordinates of vehicles are determined according to the relative geographic coordinates.

17 Claims, 13 Drawing Sheets

TEMPORARY TECHNOLOGICAL SCHEDULE
of post-flight service of (BC) IL-96 (120 minutes)
when performing international flight in Domodedovo airport

ИЛХ: МАД: ДДС: ДЭС: АВК: АТ5: ИПАС: ДТ:

| № | Operation | Time start | Time end | operation duration | Executant |
|---|---|---|---|---|---|
| 1 | Positioning (BC) on the it stand | | 0:00 | | АТБ* |
| 2 | Positioning seating shoes | 0:01 | 0:02 | 0:02 | АТБ* |
| 3 | (BC) grounding | 0:02 | 0:03 | 0:02 | АТБ* |
| 4 | Connecting to ground power supply | 0:03 | 0:04 | 0:02 | АТБ* |
| 5 | Stairs opening/driving | 0:04 | 0:06 | 0:03 | АВХ |
| 6 | Opening cargo doors | 0:04 | 0:06 | 0:03 | АТБ* |
| 7 | Frontier Guard and Custom control and control of (?) | 0:04 | 1:58 | 1:55 | Customs, ОПК, САБ |
| 8 | Sanitary/quarantine control | 0:04 | 0:07 | 0:04 | СКП |
| 9 | Draining chemical liquid/water if (required) | 0:31 | 0:50 | 0:20 | АТБ* |
| 10 | Supplying buses | 0:04 | | | АВХ |
| 11 | Passenger landing | 0:07 | 0:31 | 0:25 | АВХ |
| 12 | (BC) inspection, including-compartment,<br>-cargo spases, service compartments | 0:31<br>0:09 | 0:50<br>** | 0:20 | Customs, ОПК, САБ, АТБ, |
| 13 | Passing Passenger thru Customs and Frontier Guard Control | 0:20 | ** | | Customs, ОПК, |
| 14 | Frontier Guard and Customs Crew Execution | 0:31 | ** | | Customs, ОПК, |
| 15 | Unloading luggage, cargo, mail | 0:10 | 1:39 | 1:30 | ДТК |
| 16 | Arrival, unloading howx property, cleaning (BC) | 0:50 | 1:56 | 1:07 | ДЭС |
| 17 | Unloading remaining in board feed | 1:02 | 1:51 | 0:50 | ДЭС |
| 18 | Delivering luggage from vehicle to transporter | 0:35 | 1:00 | 0:26 | ДТК, АВК, |
| 19 | Luggage Customs Control | 0:35 | 1:10 | 0:36 | Customs |
| 20 | Transferring (ACC) (if required) | 0:50 | 1:00 | 0:11 | АТБ* |
| 21 | Sanitary Unit Treatment | 0:50 | 1:15 | 0:26 | АТБ* |
| 22 | Closing Cargo Doors | 1:56 | 1:58 | 0:03 | АТБ* |
| 23 | Closing/Driving-off Stairs | 1:56 | 1:58 | 0:03 | АВХ |
| 24 | Power Supply Shut-off | 1:58 | 2:00 | 0:03 | АТБ* |

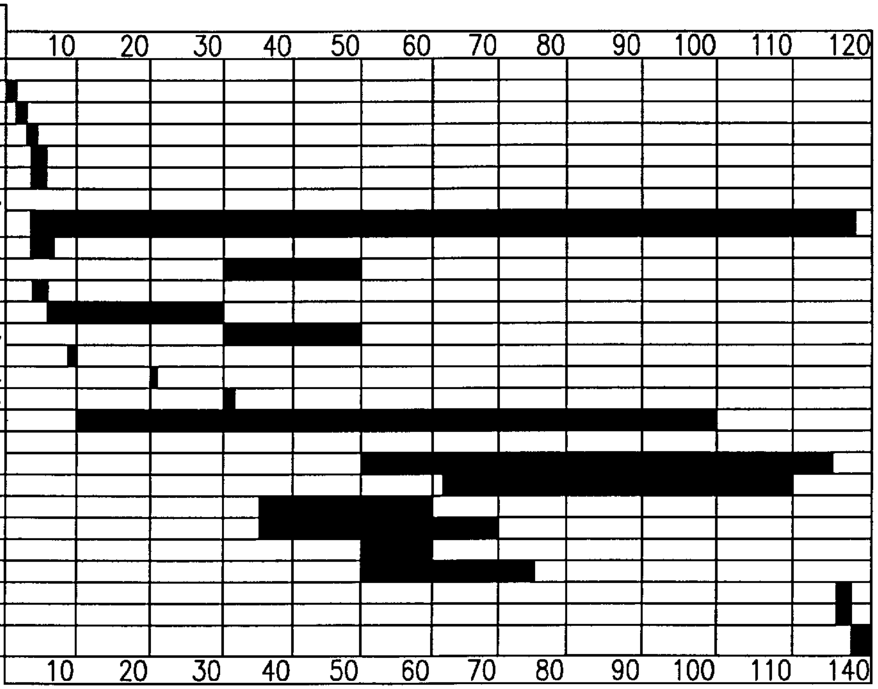

АТБ* – Service may be rendered by Air Company Technical Units

**Customs and (opk) finish work at their discretion.

FIG. 3

TECHNIQUE OF REAL-TIME TRACKING AND MANAGEMENT OF LAND-BASED VEHICLES OF THE AIRPORT

The invention relates to the field of management of transport vehicles on the airport territory using satellite positioning technologies.

There exists the technique of audiovisual warning of a risk of collision (intersection) of aircrafts (AC) and land-based vehicles (LBV) that enables emergency stopping an AC and LBV trying to move to the runway without authorization. The technique is based on controlling the location of an AC and LBV by automatic sensors, by way of activation of the stop barrier, warning of the pilot by radiophone, tracking lighting turn-on. In case of unauthorized crossing of the stop barrier, impulse searchlights are turned on automatically by sensors, such searchlights being set up so that to cover the pilot's field of vision, and sound and light alarm systems are turned on automatically at the control center (see RF application #94005903, cl. G 08 G 5/06, publ. 1995)—analogue.

The deficiency of this technique is as follows: non-availability of information at any particular moment about location of LBVs, their routes, speed of their movement, state of LBVs, terms of execution of works and compliance of such works with the technological schedule of works that reduces effectiveness of LBV management, does not provide objective information on state of LBVs and, therefore, reduces security of flight servicing works at the airport.

There also exists the technique of real-time tracking and management of aircrafts (ACs) and land-based vehicles (LBVs) of the airport that includes formation of a 3D geoinformation system of the airport territory (AT), real-time determination of geostationary geocentric coordinates of ACs and LBVs, control of speed and/or routes of LBVs and LBV traffic management (see U.S. Pat. No. 5,867,804, cl. G 06 F 163 /00, publ. Feb. 2, 1999)—prototype.

The deficiencies of the given technique are as follows: over-sophistication of co-ordinates algorithms (due to recalculation) of tracking and management of LBVs and large implementation expenses because of direct transfer of vehicle-borne equipment of ACs and methods of solution of tasks in the air to land-based equipment of LBVs, overburdening of dispatchers with information due to use of information display devices of air traffic control terminals (ATC). Moreover, there is subjectivism in receipt of information about nature of works being performed and state of LBVs, so its reliability is low. There is no real-time information about state of LBVs and terms of performance of different works by them in accordance with technological schedules of AC servicing and daily plans of flights, as well as an increase of time for determination of current co-ordinates of LBVs that affects decision-making as to management, reducing safety.

The objective of the technique to be patented is to increase effectiveness and safety of tracking and management of LBVs and to reduce expenses for implementation of the technique, as well as to increase reliability of information about LBVs, to exclude subjectivism as far as receipt of information is concerned and to improve quality of AC and traveler servicing works carried out by LBVs. Moreover, the objective of this technique is to provide for receipt, transfer, storage, analysis and processing of information about performance of AC servicing works by LBVs.

The specified objective is reached by the fact that the technique of real-time tracking and management of land-based vehicles (LBVs) of the airport that includes formation of a geoinformation system of the airport territory (AS), real-time determination of co-ordinates of LBVs using satellite positioning devices, control of speed and/or routes of LBVs and LBV traffic management, as compared to the prototype technique, provides for permanent control of state of LBVs and/or time of execution of works by each LBV and management of traffic and performance of works by LBVs in accordance with time technological schedules of post-flight servicing of aircrafts (ACs) on the basic of daily plans of flights, in this case the geoinformation system of the AT is formed in the two-dimensional coordinates, and LBV co-ordinates are determined in the relative geographic coordinates.

As well as that state of LBVs is controlled and/or coordinates of LBVs are determined using satellite positioning devices by way of periodic inquiry, and data obtained are transferred to the central database of the dispatcher center for subsequent storage, analysis and processing.

As well as that control of state of LBVs includes control of turn-on/turn-off of ignition, opening/closing of doors, lifting/lowering of elevators to a predetermined height, cargo weight, AC board contact, entry/withdrawal from the works execution area, volume of fuel and water during fueling ACs, contact of special LBVs (tractors) with the front leg of the AC undercarriage, crippling of equipment of LBVs, distance to an object and/or integrity of cargo packing.

As well as that contingencies and reaction of drivers and/or automatic devices of LBVs to them are also controlled.

As well as that breakdowns, fire and/or terrorist attacks are taken into consideration while controlling contingencies.

As well as that management of traffic and execution of works by LBVs are carried out by way of transmission of massages from and/to LBVs in interactive mode and/or in strictly formalized mode.

As well as that transmission of messages from and/or to LBVs and receipt of data about state of and/or coordinates of LBVs is effected over a dedicated digital channel.

As well as that the geoinformation system of the airport territory is formed in a multi-level structure.

As well as that the multi-level structure of the geoinformation system of the airport territory includes the airport surface, underground communications, overground objects, a scheme of distribution and arrangement of traffic of LBVs, special transports and carriers.

As well as that the geoinformation system of the airport territory is represented as a digitalized map with scale change elements.

As well as that while controlling LBVs, LBV traffic routes are preset using heuristic methods with a possibility of their further optimization.

As well as that location of a LBV on the geoinformation system of the airport territory is visualized by way of an icon.

As well as that GSP and/or GLONASS systems are used as satellite positioning devices.

FIG. 3 shows the time technological schedule of post flight servicing of LBVs.

Figure 1:
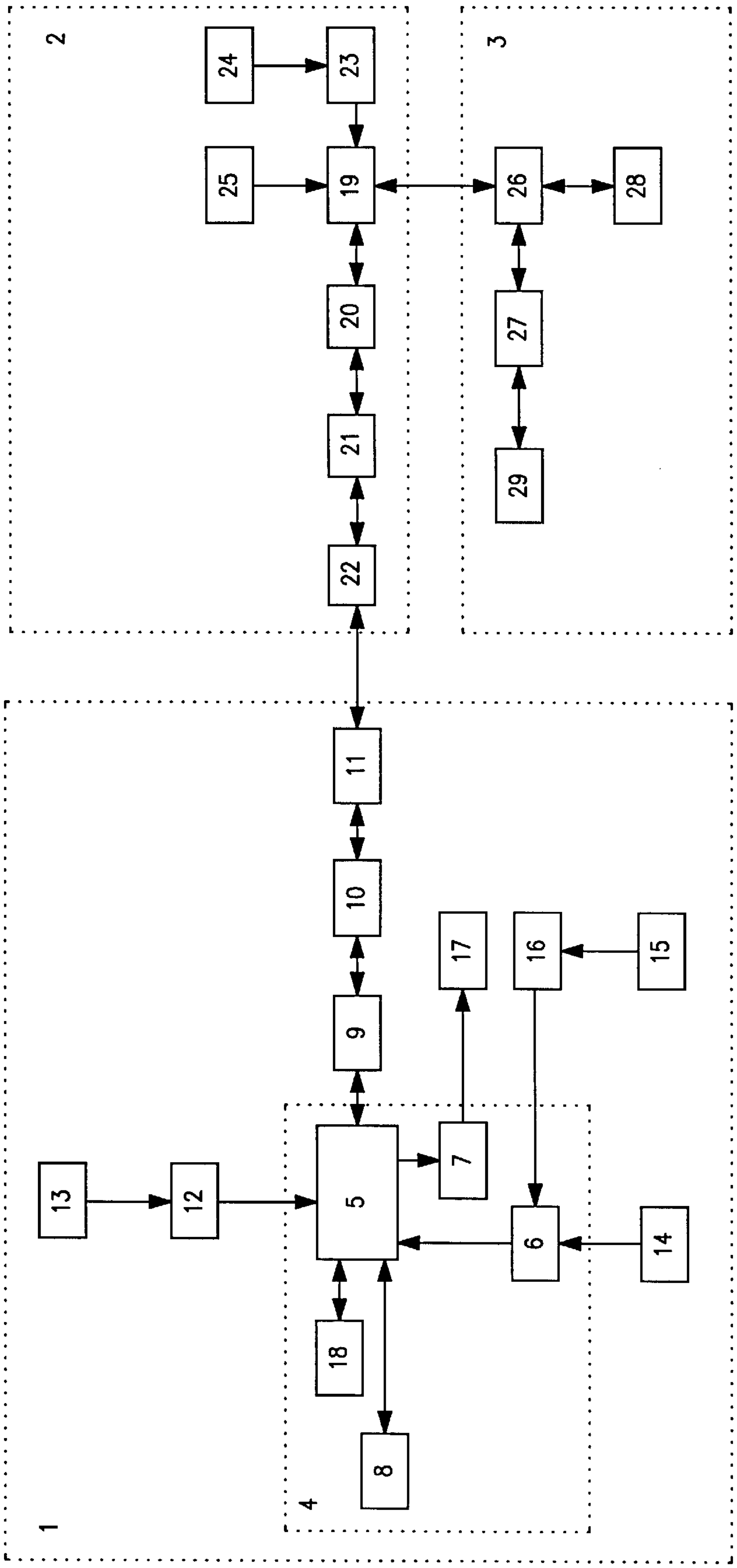
FIG. 1 shows the system of real-time tracking and management of land-based vehicles (LBVs) of the airport that realizes the technique to be patented.
Figure 2:
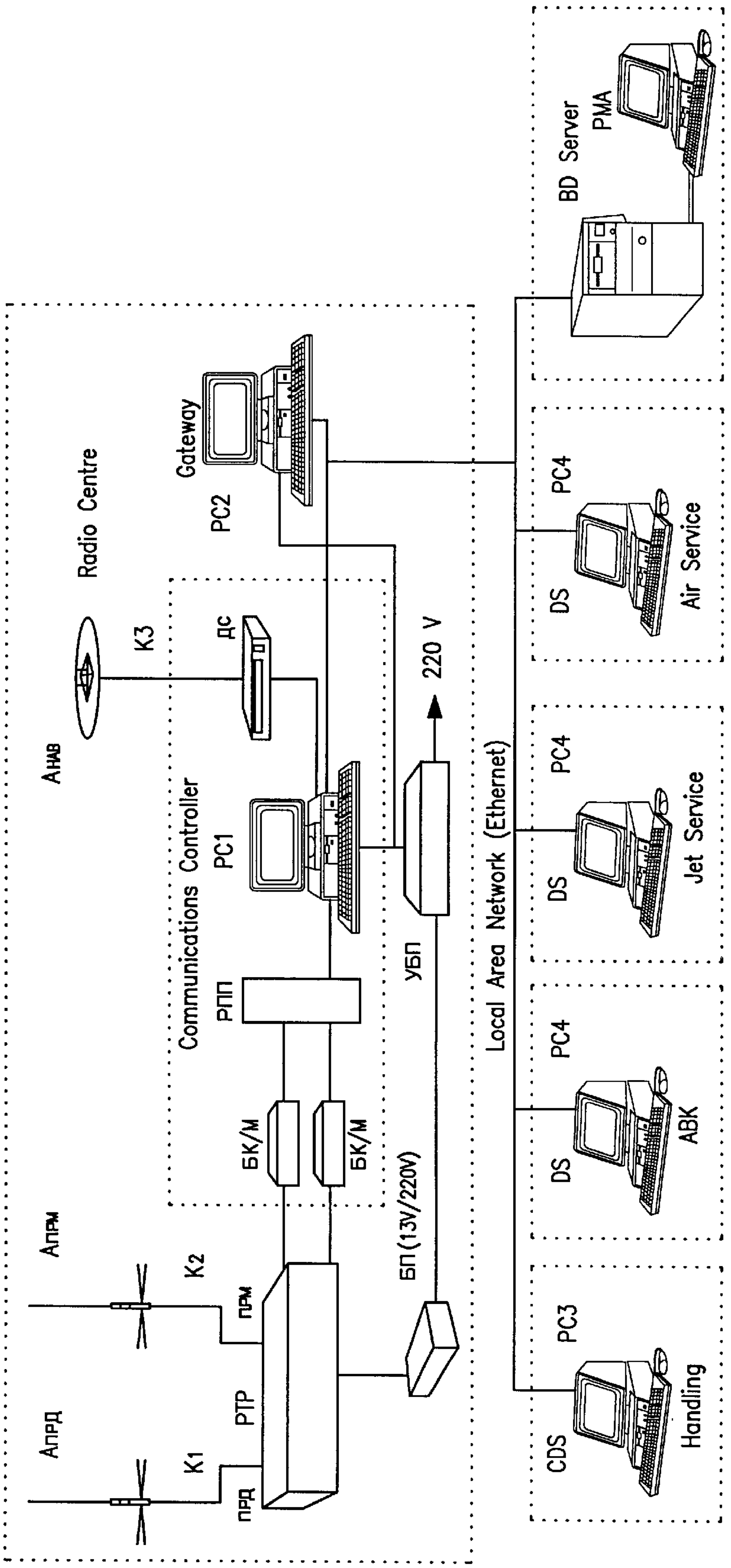
FIG. 2 shows the structure of the system's hardware and software complex.
Figure 4:
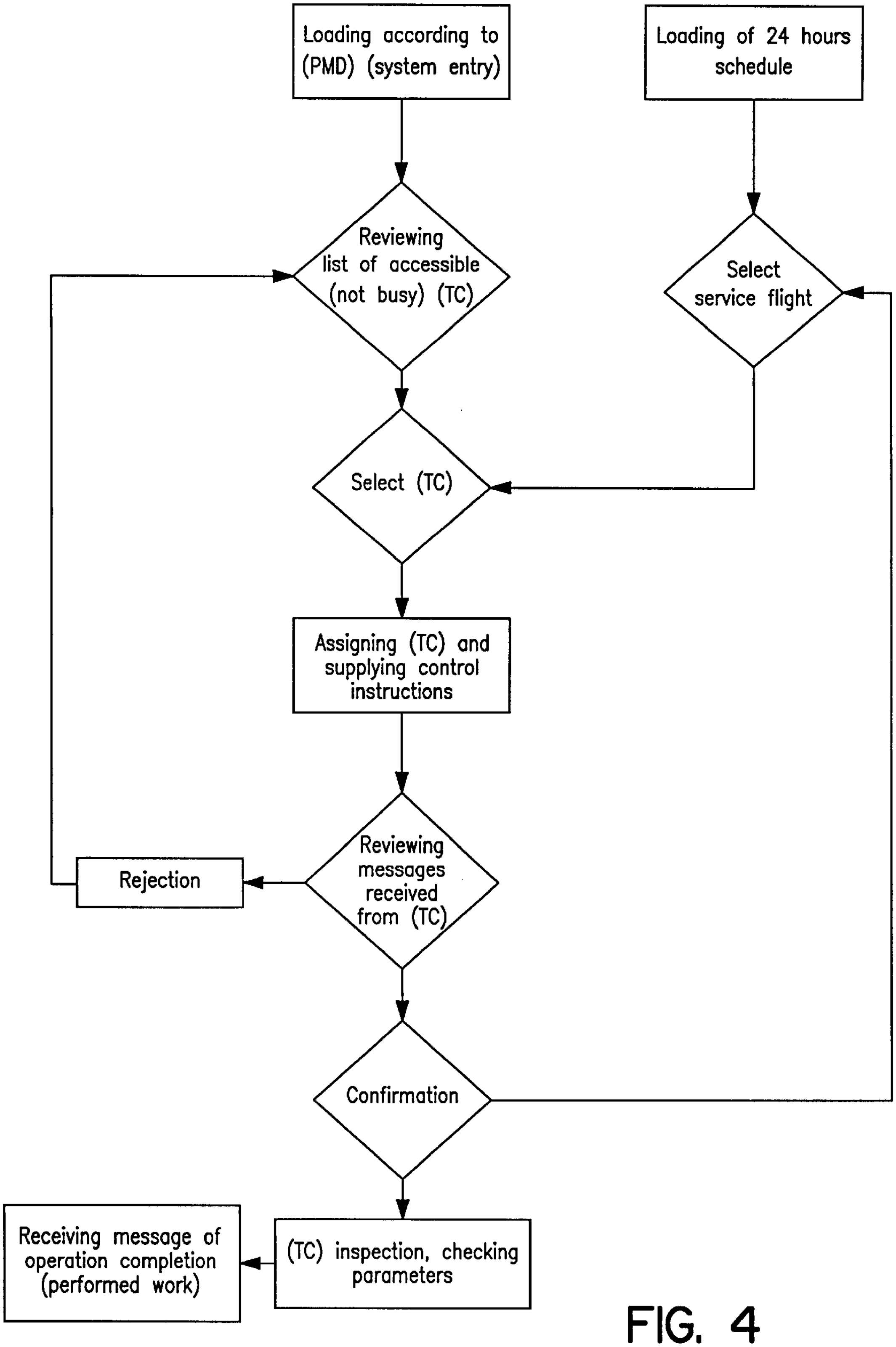
FIG. 4 shows the algorithm of work of DS dispatcher.

The system of real-time tracking and management of LBVs of the airport consists of a vehicle-borne complex 1, a communication and channel control subsystem 2 and an applied subsystem 3. Connection between the applied subsystem 3 and the communication and channel control subsystem 2 is carried out over the Ethernet, connection between the vehicle-borne complex 1 and the communication and channel control subsystem 2 is carried out over a dedicated digital radio channel (USW band).

The vehicle-borne complex 1 is set up on each LBV and consists of a vehicle-borne controller 4 that represents a microprocessor 5 (MP) with input 6 and output buffers and nonvolatile memory 8 (FLASH). Microchip Technology Inc: Pic 16 C 77 X Family can be used as a MP 5. The MP 5 is connected through a modem 9 to a radiostation 10, for example, GM350, with a USW-antenna 11 and a multi-channel navigation GPS receiver 12 with a navigation antenna 13. A LBV state control module 14 and a power module 15 of 8–32V are connected to the input buffer 6 of the MP5 through a LBV ignition lock 16. The LBV state control module represents a set of sensors that includes, for example, an ignition turn-on/turn-off sensor and/or a doors opening/closing sensor and/or a sensor of lofting/lowering of elevators to a predetermined height and/or a sensor of a LBV's contact with a AC's board, and/or sensor of entry/withdrawal from the works execution area, and/or a vehicle-borne equipment crippling sensor, and/or a sensor of distance to an object, and/or a cargo packing integrity sensor.

The output buffer 7 can be connected to a beacon 17 that gives signals of a communication call and/or trespassing a dangerous (restricted) area, and/or a loud speaker.

The vehicle-borne controller 4 can be produced in two ways: with a text terminal or with a remote key panel 18.

The text terminal is designed for providing the driver with paging communication with the dispatcher and displaying information about operation of the vehicle-borne complex 1. If the driver has such a terminal he can send to the dispatcher (or receive from him) a standard set of messages that correspond to different situations in on-line mode. The text terminal is made as a liquid-crystal indicator (LCI) with 4 hermetic lighted keys, which is connected through a LCI controller to the MP 5.

Instead of a LCI the MP 5 can have a remote key panel that is designed for performance of a limited (tabulated) set of functions as the text terminal and is fixed on those LBVs that do not provide for use of a text terminal and enables sending messages in point-to-point operation.

The MP 5 of the vehicle-borne controller 4 controls the radio station 10 and navigation receiver 12, moreover it enables automatic startup of the whole vehicle-borne complex 1 on turn-on of the ignition lock 16 of a LBV and its shutdown after expiration of preset time after turn-off of the engine to prevent discharging of the vehicle-borne power module 15 that is represented by, for example, a LBV battery.

A GPS receiver can be used as a multi-channel navigation receiver 12 that decodes and processes satellite signals and thus determines coordinates, speed and route of LBVs and is specially designed for mobile applications.

The navigation receiver is based on two chips of Rockwell company that contain a majority of necessary GPS-functions. "Gemini/Pisces" MonoPacTM contains all radio frequency signal conversion and multiplication circuits. It transfers a signal to Scorpio circuit. Scorpio circuit contains an integrated chip and all hardware required for special processing of a GPS-signal. Memory and auxiliary components add to these chips to complete the navigation system.

The communication and channel control subsystem 2 includes a serial communication controller 19, a modem 20, a readiostation 21 with a combined USW-antenna 22, as well as a differential adjustment unit (DAU) 23 with a navigation GPS antenna 24, a power unit 25 mostly uninterruptible one like UPS.

The DAU 23 is a high-frequency multi-channel navigation receiver with phase processing of signals.

A differential GPS (DGPS) Jupiter (see, for example, U.S. Pat. No. 56,003,329, cl. 342/357.03, publ. Feb. 4, 1997) that enables determination of not absolute but relative geographic coordinates, for example, coordinates in relation to an affixed reference point on the ground surface, that increases positional accuracy (systematic error correction), can be used as a DAU 23.

The IBM PC-based communication controller 19 provides for receipt of a data stream that is transmitted over a radio-channel and its decoding.

Original algorithms protected by U.S. Pat. Nos. 2,070, 315, 2,095,757 are realized in the communication controller 19.

The applied subsystem 3 or as it is called "control center" (CC) consists of a lock 26 being a device that ensures conversion of data from external formats to a format perceived by a server 27 connected to database memory 28 that is designed for archiving and storage of data about servicing of LBVs, LBV traffic routes, LBV state and other information. At least one dispatcher station (DS) 28 is connected to lock the 26. There can be any number of DSs, but the optimum number is 3–5 stations. The dispatcher station (DS) is designed to display information about location and state of LBVs in the form of a table (LBV identifier, type of LBV, speed, generation of data about LBV, state of incremental transducers, etc.), inserting of housekeeping information (type of LBV, crew number, route), receipt of requested on-line information about location and state of vehicles from the remote database of the control center (CC), display of an apron territory graphic outline, display of LBV location on a graphical scheme, handling of graphic data (zooming, scrolling, etc.), automatic control of events connected with LBV traffic parameters and an AC technological servicing schedule, audible warning of the dispatcher and change of the LBV image (color of an object shown) in case of receipt of an alarm message. Interaction of the applied subsystem 3 with the communication controller 19, as well as connection of the lock 26 to the DS 28 is carried out over the Ethernet. The server, for example, Sun ULTRA 10 with the database management system Oracle 8 is used as a server.

Operation under the technique to be patented is carried out as follows:

The MP 5 of the vehicle-borne controller 4 collects and preprocesses navigation information from the navigation receiver 12 and from the LBV state control unit of the vehicle-borne sensors 13, receives and transmits telemetry information, visualizes text messages, controls operation of the radio-station 10.

Vehicle-borne equipment is connected to the power module 15, for example, to a LBV battery, through the ignition lock 16 of a LBV. On turning on the ignition lock 16 of a LBV a signal is delivered to one of inputs of the input buffer 6 of the MP 5 of the vehicle-borne controller 4. On receipt of the given signal the MP5 of the vehicle-borne controller 4 generates instructions for transfer of the navigation receiver (NR) 12 from standby mode to operating one and for turn-on of the radio-station 10 and lighting of a LCI or key panel 18.

On turn-off of the ignition lock 16 after 6-minute holdup the MP 5 of the vehicle-borne controller 4 generates instructions for transfer of the NR 12 to standby mode and turn-off of the radio-station 10. The given procedure is required for prevention of LBV battery discharging.

The NR 12 receives satellite signals from the navigation antenna 13 and yields geographic coordinates of location of LBVs with an interval of, for instance, 1 second. Navigation information is added with housekeeping data (measuring mode, number of observable satellites, etc.) and is transmitted to the MP 5 of the vehicle-borne controller 4 through a two-directional asynchronous port. The MP 5 of the vehicle-borne controller transmits information about mode of NR operation to a LCI 18 for visualization.

The MP 5 of the vehicle-borne controller 4 enables the LBV driver to send a text (formalized) message out of a preset list to the CC 3. Message data are stored in nonvolatile memory 8 and can be visualized on the LCI 18. Messages are divided into urgent and informational. The latter ones are grouped into blocks, that allows finding and selecting a necessary message for sending to the CC 3. A massage is selected and sent using a key panel. In this case it is not a message itself, which can be rather long, but only its number that is transmitted over a radio channel so reducing the volume of information transmitted and increasing the band-width of a radio channel.

The MP 5 of the vehicle-borne controller 4, which is not equipped with a text terminal but has a remote key panel, allows sending only formalized messages: "ALARM", "COMMENCEMENT", "COMPLETION", "DELAY", etc.

The MP 5 forms a data package for transmission over a radio channel to the CC 3 in accordance with the digital information exchange internal protocol. The package includes the following data:

navigation parameters (coordinates, speed, route, time);

state of sensors;

number of the latest formalized message selected for sending.

A package can be sent automatically or upon an inquiry from the CC 3 that is delivered over a dedicated digital radio channel between USW transmit-receive antennas 11 and 22. Information exchange between the MP 5 and the vehicle-borne radio-station 10 is carried out through the analog interface. Upon receipt of an inquiry the MP 5 sends a data package to the radio-station 10 directly or through a modem 9. The transmission process is accompanied by confirmation of successful receipt of the package by the vehicle-borne radio-station 10 and of successful delivery of the package to the base radio-station 21.

Upon receipt of a text information package from the CC 3 the MP 5 places it into the nonvolatile memory 8 and visualizes it on the LCI 18.

The communication and channel control subsystem 2 is designed for organization of communication over radio-channels with LBVs, receipt of telemetric information from LBVs, its preprocessing and transmission to the server 27 for further displaying on one of the screens (terminals) of the dispatcher stations (DS) 28.

The differential adjustment unit (DAU) 23 is set up to a point with known (predetermined) datum coordinates. Comparing current results of measurements from GPS satellites with datum coordinates, the DAU 23 generates correlation allowances on the basis of the method of statistical analysis of accidental errors of measurements, allowances are delivered to the communication controller 19 with the interval of 1 second and are used for adjustment of current location of a LBV.

The communication controller 19 processes both navigation information about location of LBVs and correlation allowances generated by the DAU 23 and adjusts current geographic coordinates of LBVs to relative ones for the purpose of increasing accuracy of position measurement. There can be reached accuracy of LBVs position measurement of up to 1–3 m (or less than 1 m).

The application system 3 (control center CC) interacts with the communication controller 19 over the local network Ethernet and is the end user of information. The database memory 28 of the server 27 stores all information about operation of LBVs, dispatchers, their interaction, as well as information about AC servicing schedules. Such information at any moment can be requested in order to carry out, for example, an analysis of operation for correction of traffic management.

A DS 28 includes a specialized geoinformation subsystem that provides for 2D multi-structural real-time displaying of current situation on an electronic map, service capacities for control of operation of LBV crews, means of detection of situations that require dispatcher intervention, etc.

The dispatcher handles LBV traffic and performance of works by LBVs in accordance with AC technological servicing schedules on the basis of the daily plan of flights. FIG. 3 shows an example of such a schedule. It includes a list of works on servicing of a particular AC, in this case of IL-96, time of commencement and completion of a particular operation, duration of works, executor, as well as a network schedule of performance of works as a time diagram.

For lock-on of a LBV to the technological schedule the dispatcher at the DS takes the following actions:

1. Selection of a necessary flight out of a list of arrivals and departures, after that a table of technological servicing of ACs of a given type becomes accessible where time for each operation in accordance with current data of the daily schedule is fixed.
2. Selection of a necessary operation out of the technological schedule.
3. Startup of the Assignment mode, after that there appears a list of LBVs that can perform the given operation and for which there is no other servicing operation assigned on the same time.
4. Selection of an appropriate LBV, after that a text message for the selected LBV is formed automatically where time of commencement and completion of the operation and a place of performance of the operation are fixed.
5. Insertion of additional information into a message (if required).
6. Confirmation of transmission of a control message to the LBV.

Control of the following operations of LBVs is ensured (assignment means an operation of the technological schedule that is assigned by a dispatcher for performance by a given LBV permitted for such operation):

1. Confirmation of receipt of an assignment—the LBV driver has received an assignment and is ready to arrive at an assigned place and time.
2. Commencement of performance of an assignment—the LBV driver has arrived at an assigned place and started performing such assignment.
3. A signal about demurrage due to others' fault—the driver cannot get down to an assignment as a proceeding operation of the technological schedule has not been completed. Such situation leads to a demurrage mark in a special table.
4. An emergency signal—the driver cannot get down to an assignment or cannot go on performing an assignment because of an emergency situation. Such situation leads to an alarm mark in a special table, accentuation of a message from the given LBV with the red color, a sound signal and termination of an assignment.

5. Completion of an assignment—the driver has successfully completed an assignment.

A LBV is considered to be assigned only after the driver has confirmed receipt of such assignment.

A notification of completion of one of the above-mentioned operations can be transmitted from a LBV to a dispatcher over a radio channel or can be entered by a dispatcher from the DS if it was received in a way that is not controlled by the system automatically.

The system matches assigned time of completion of the operation and real (current) time. In case of delay in commencement of performance of works the system marks in red a scheduled time of commencement of an assignment and calculates duration of delay. In case of delay in completion of an assignment the system marks in red a scheduled time of completion of an assignment and calculates duration of delay. There follows an example of implementation of the technique to be patented.

Control of state of LBVs includes, for example, control of involvement of a LBV in a AC servicing operation, assignment wait (ignition off); movement to a parking; performance of assignments other than on servicing of ACs (fueling, checkup, etc.); state of communication, state of GPS; speed of movement, ignition on and off, a distance to an AC (for ramps); opening and closing of doors (for buses); lifting and lowering of elevators (for elevators); route; opening of an equipment bay; time of receipt of the latest package from a LBV; state of LBVs.

While managing LBV traffic and work there can be entered any random instruction, for instance, bus #__ move to stop #__; bus #__ help #__; bus #__ pick up duty officer at entrance #__; etc.

30 formalized instructions (messages) from LBVs are "threaded" into the memory of MP 5 of the vehicle-borne controller 4:

| | |
|---|---|
| - medical aid required | - Moved to parking without agent |
| - SC officers required | - Arrived at parking |
| - AC damage | - Commencement of boarding of passengers to bus |
| - Accident | - Arrived at air terminal |
| - Breakdown | - Commencement of debussing |
| - Parking assignment accepted | - Debussing finished |
| - Bus for agent brought up | - Loading finished |
| - Moved to parking with agent | - Arrived at parking; get down to fuelling |
| - Bus brought up to exit | - Fuelling finished |
| - Ramp set up at parking | - Arrived at parking, get down to assignment |
| - Ramp driven away | - Assignment completed |
| - Ramp left at parking | - Commencement of operation |
| - Arrived at terminal | - Completion of operation |
| - Commencement of movement to base | - Obstacle removed |
| - Assigmnent accepted, performing | |
| - Arrived at parking, started loading | |

Actions of the Operator at the DS 28

1. Log-in

Figure 5:
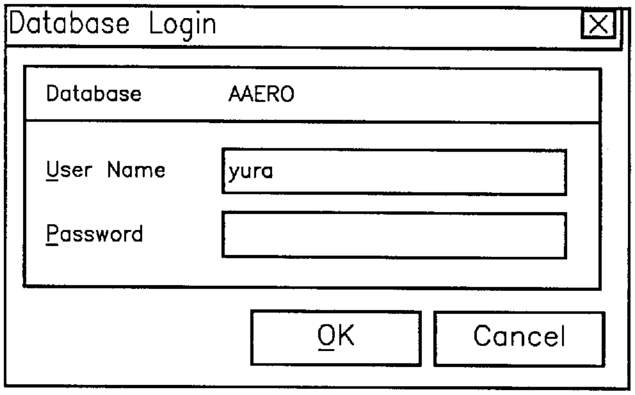
FIGS. 5–17 show images on the DS display during the operator's work.

On entering the system at the beginning of a shift in order to access the system the DS 28 operator performs registration. For this purpose he selects the Login command in the File menu. There appears an operator registration dialog box on the screen lapped over the main box (see FIG. 5).

An operator's own (code) name (User Name) and Password should be entered into the fields of this box. The code name ("English" letters are used) is agreed with the maintenance programmer (DB administrator) prior to use of the system.

Password, when entered, will be shown as the symbols "*"—one "star" for each character entered.

Since a user name and password are entered, press OK or <Enter>. If everything is correct the Database Login box will disappear and the dispatcher can get down to work. Note: Registration of an operator in the system and his authorization (identification) for access to information and fulfillment of instructions are carried out by the system administration. The system administrator gives a password to the operator that must by used by him for registration. Access to the system can be refused for the operator under the following conditions:

operator's name is not registered in the system;

other operator logged into the system under the given name;

operator's name and password are entered incorrectly.

2. Log-off

Figure 6:
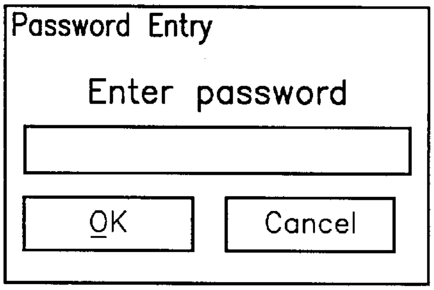
Figure 7:

When a shift is over the operator must complete the session by canceling his registration in the system. For this purpose he should select the LogOff command of the File menu. There appears a dialog box for entering a password on the screen lapped over the main box of the application (see FIG. 6).

The operator should enter the password used at the beginning of the session. It will be shown as a "*"—one "Star" for each character entered.

Since a password is entered, he should click OK or <Enter>. It everything is correct the box will disappear and the dispatcher can leave his station. Another dispatcher taking over the shift at this DS must start his work with registration (see 1. Log-in).

3. LVBs Movement and State Tracking

3.1 Apron Territory Monitoring

A scheme of arrangement and organization of traffic of ACs, special transports and other vehicles and parking lots—MS Scheme (electronic map)—is used for apron territory monitoring. It occupies the top part of the application main box and can be of different scale both in whole and as a separate fragment. Representation is managed by clicking (selecting) tool keys represented on the toolbar (see 7).

The mouse is used to select a tool. Keys-arrows move the visibility scope (box) in the appropriate direction over the "fixed" map. The key increases the scale of the map,—enlarges representation while keeping location of its center. The key performs the reverse action enlarging dimensions of a visible part of the apron and decreasing the scale of representation. The key allows seeing the whole map on the screen.

3.2. Vehicle Location Monitoring

For the purpose of monitoring location of vehicles a map in the application main box and the Vehicles bookmark (see FIG. 8) are used; vehicles are depicted on the map as icons—each icon corresponds to type of vehicle:

- Tractor

- Bus

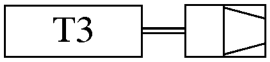

- Refueller

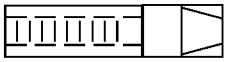

- Ramp

- Sanitation vehicle

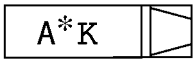

- Autoelevator

-Water filling and washing vehicle

A line in the right spreadsheet at the bottom of the bookmark corresponds to each vehicle. The spreadsheet on the left side of the bookmark allows limiting the number of vehicles that can be seen in the right spreadsheet by attribution to a particular type.

If the search vehicle is not represented in the visible area of the scheme it can be selected in the spreadsheet on the Vehicles bookmark. By the Show On Map instruction an object selected in the spreadsheet is placed to the center of the area occupied by the scheme. The scale of the scheme is not changed and the visible area moves to the required direction.

In order to search a vehicle in the spreadsheet there can be used the Find Vehicle in Spreadsheet box. Assignment for a vehicle is given by entering its name into this box or selecting the name in a pop-up list. On clicking the Find key a search vehicle will appear as a marked line. If to click Show On Map thereafter the vehicle will appear in the center of the scheme.

3.3. Control of Vehicle State

Figure 8:
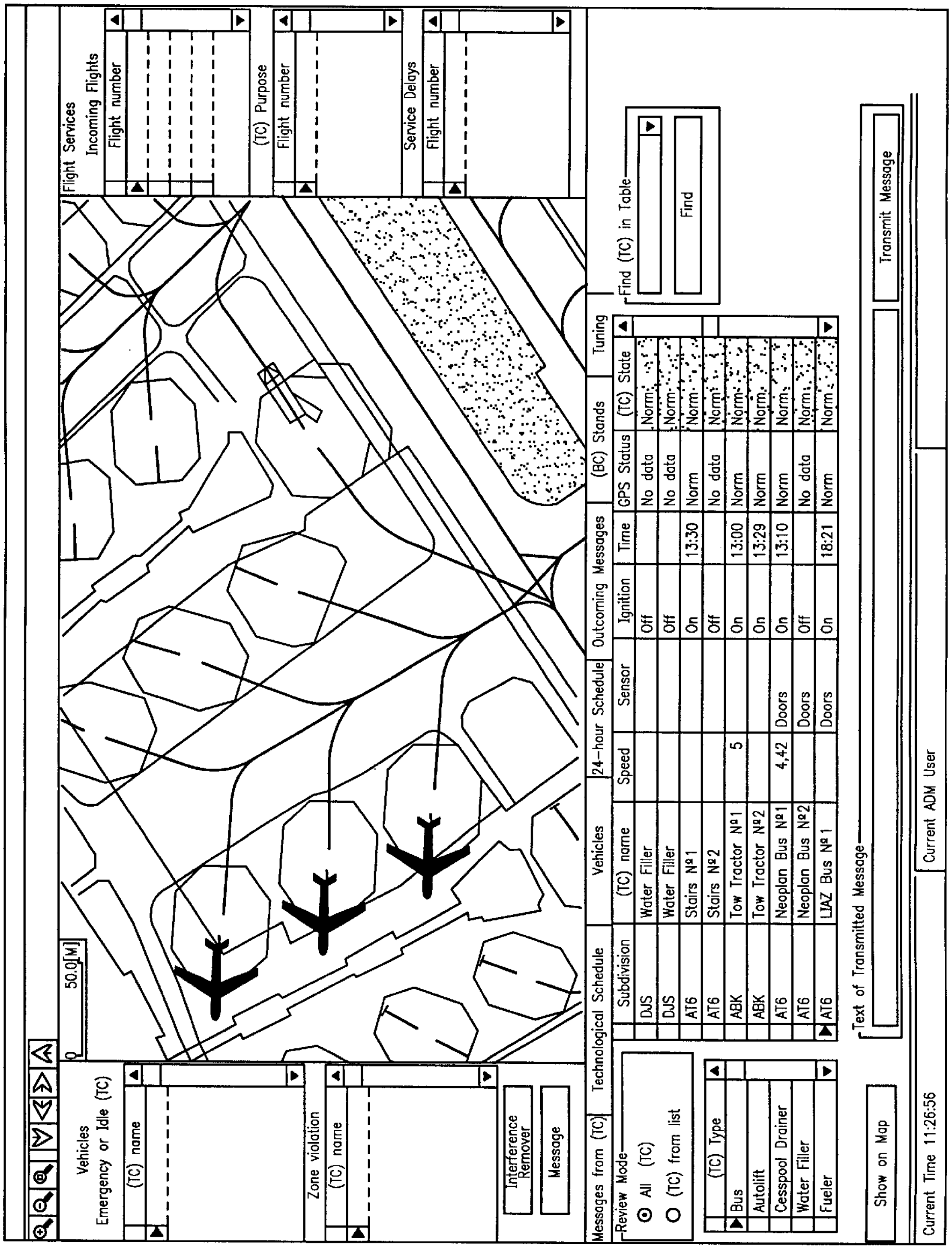

State of vehicles is controlled according to their images on the electronic map and state spreadsheet on the Vehicles bookmark (see FIG. 8 in "Vehicles Location Monitoring").

The following information about vehicles state is shown in the spreadsheet:

Speed—current speed of an automobile (km/h) is indicated. If speed of a vehicle does not exceed admissible one then the value is shown in green. In case of violation by a vehicle of speed mode (for example, over 20 km/h) the speed value is shown in red and an audio signal sounds periodically.

Vehicle state control sensors 14—state of sensors vehicles are quipped with in accordance with the following spreadsheet is indicated:

| Sensor number | Controlled device | Type of vehicle equipped with sensor |
|---|---|---|
| 1 | Door #1 | Buses |
| 2 | Door #2 | Buses |
| 3 | Door #3 | Buses |
| 4 | Door #4 | Buses |
| 5 | Equipment bay | Domestic bus, domestic ramp |
| 6 | Distance to AC | All ramps |

In case of doors sensor reaction—"Doors 123456" (all doors are open), "Doors 1.3. (Doors # 1 and #3 are opened). If all doors are closed—"Doors . . . "

In case of equipment bay sensor reaction—"Bay open".

In case of distance sensor reaction—"Over 1 meter to AC" or "Less than 1 meter to AC".

Ignition—state is indicated—on or off.

Time—time of formation of the last package from a vehicle is indicated (hh.mm).

GPS status—information about age of coordinate data.

Vehicle state—general state of a vehicle—normal, delay, alarm.

For the purpose of controlling state of vehicles colors of vehicle icons are translated as follows:

Black—data received from a vehicle are obsolete (received over 15 minutes ago).

Gray—vehicle ignition is tuned off

Red—an alarm signal comes from a vehicle

Blue—a vehicle operates properly

Green—vehicle ignition is turned off

Names of vehicles involved in an emergency situation or are idle due to conflicts at MS, are indicated in the spreadsheet to the left of the scheme (emergency list). To find out a reason why the vehicle is in the list the Show Message key should be clicked which is located below the list. As a result the Messages From Vehicle bookmark will appear in the bottom part of the box, and a message that was the reason for including the vehicle in the emergency list will be marked in the spreadsheet on this bookmark. For vehicles not equipped with text terminals determination of a reason for occurrence of an emergency situation is made through voice communication with the driver.

In order to delete a vehicle from the emergency list the operator can use the Obstacle Removed key located below the list. Vehicles from which the system receives a message of recovery of serviceability are deleted from the list automatically.

In case the vehicle driver trespasses a restricted area, the name of the given vehicle is placed to the spreadsheet in the left bottom part of the main box of the DS and the line with the vehicle number is colored in red. In this case an audible signal goes. In order to delete the given vehicle from the box it is necessary to point the mouse cursor to the line in the spreadsheet and press the left key of the mouse.

In case of receipt of an alarm signal from the driver the operator must take actions in accordance with the situation:

1. Medical aid required—calling of the airport medical service;
2. Security service offices required—calling of the security service and militia,
3. AC damage—calling of appropriate services;
4. Accident—calling of services appropriate to the accident;

5. Breakdown—calling of the technical support service; Such reaction of the system can be realized automatically using the formalized scheme (dominant rules) of interaction.

Figure 9:
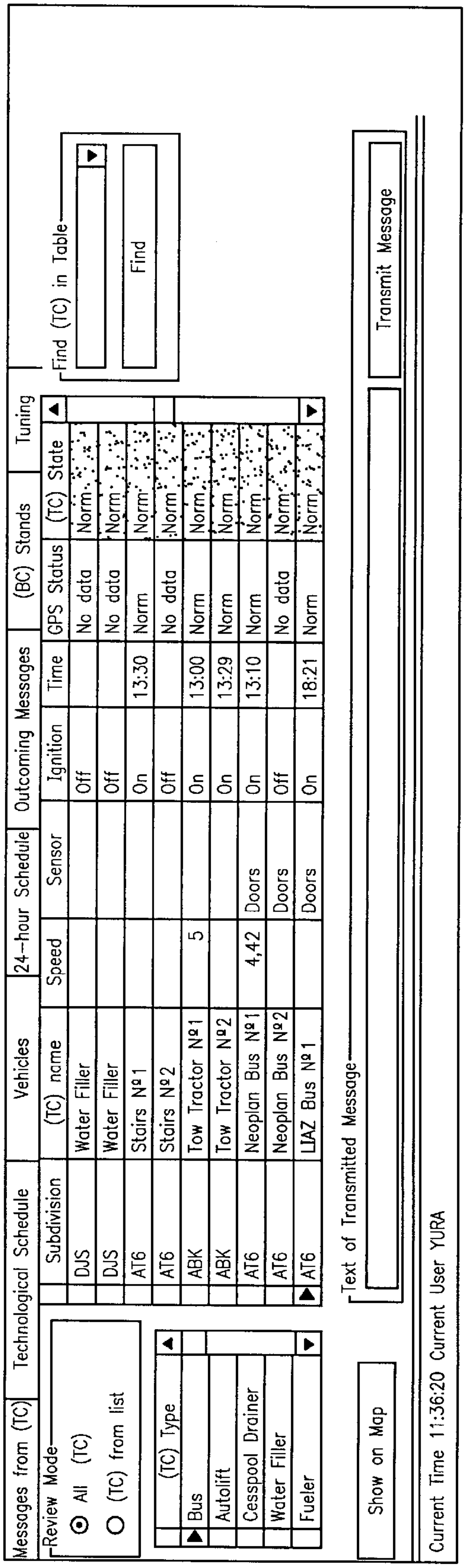

4. Exchange of Messages With Vehicle Drivers 4.1. Sending a General Message to the Vehicle Driver In order to send a general message (up to 120 characters) to the vehicle driver the following procedure must be followed:

1) Select the Vehicles bookmark (see FIG. 9);

2) Select a required vehicle from the list of vehicles;

3) Type a message into the input box at the bottom.

4) Add the message to queue for sending by clicking the Send Message key

5) Results can be controlled on the Outgoing Messages bookmark (added to queue, sent, not sent).

4.2. Viewing Messages Received from a Vehicle

Figure 10:
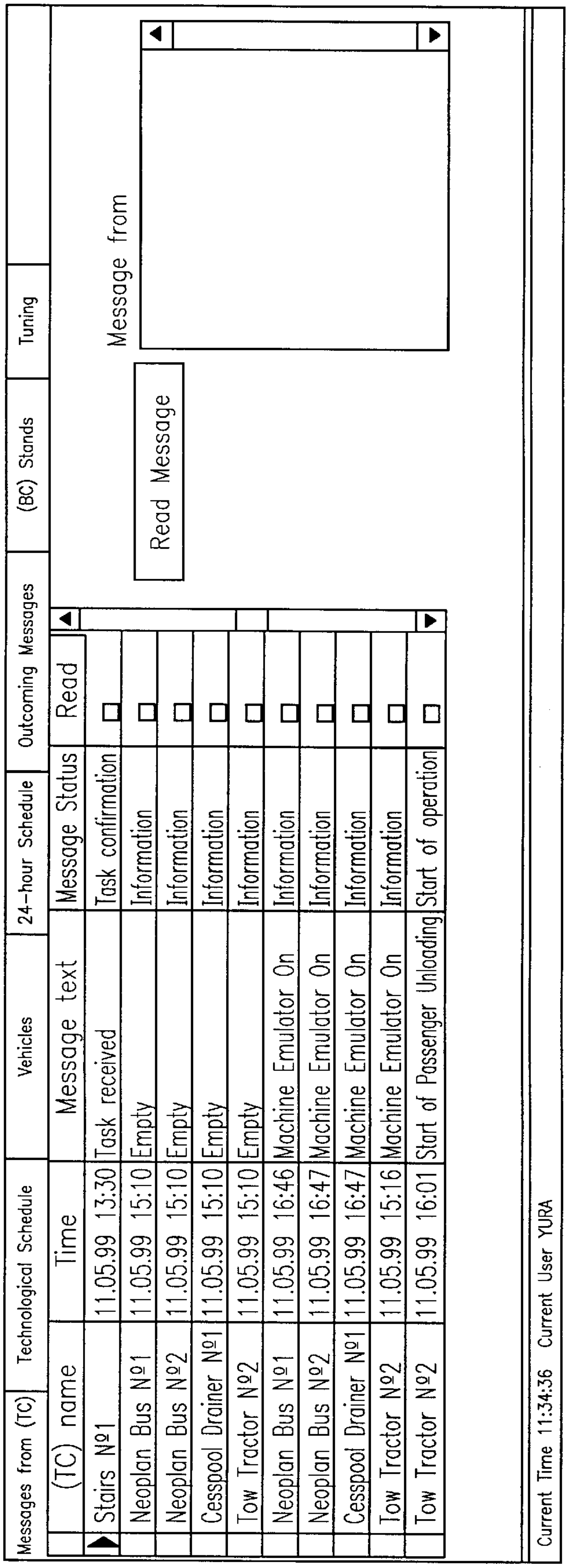

To view messages received from vehicles the operator selects the Messages From Vehicles bookmark. It displays a list of messages received from vehicles (see FIG. 10).

Messages read by the operator must by marked as “read messages”. This can be done by clicking the Read column in the line of the appropriate message, or such mark is put automatically in case the operator clicks Read Message. On clicking it the whole message (only a part of it can be seen in the spreadsheet) is shown in the right box of the bookmark. Information about what vehicle this massage was received from is shown above it (in blue).

The following table 1 shows standard messages received from vehicles, their statuses and codes.

5.1. Monitoring Occupancy of Parking Spaces by the Spreadsheet

In order to view information on parking spaces, select the Vehicle Parking Spaces bookmark (see FIG. 9).

The bookmark shows two lists: free parking spaces and spaces occupied (reserves) by ACs of particular flights.

If it is necessary to obtain data about a vehicle on the parking space the operator selects it in the appropriate list and clicks the Show On Map key. The area of this parking occupies the center of the map box.

5. Monitoring Occupancy of Parking Spaces 5.2. Monitoring Occupancy of Parking Spaces by the Map In order to show parking spaces on the map the operator must set off a line with a LBV in the appropriate spreadsheet and click the Show On Map key. Such LBV will be displayed in the center of the map box.

The parking space is shown as an octagon on the map.

An icon-silhouette of an aircraft is displayed in parking spaces where aircraft servicing works are being carried out.

6. Control of Execution of the Technological Schedule 6.1. Viewing the Daily Schedule Flight List In order to view a list of flights the operator selects the Daily Schedule bookmark (see FIG. 10).

Flight parameters are specified in the spreadsheet:

Flight number;

Scheduled arrival time;

Arrival time taking into account delay;

Board number;

Aircraft type;

Parking space (if assigned);

Flight type (local, international, unscheduled);

TABLE 1

| | | Message codes by types of LBVs*) | | | | | | | |
|---|---|---|---|---|---|---|---|---|---|
| Massage | Message status | Bus (Neoplan) | Autoelevator (Ford 800) | Sanitaion vehicle | Supplier Ford Transit | Water filling vehicle | Refueller | Ramp (ABS 580) | Tractor |
| Medical aid required | | 1 | 1 | 1 | 1 | 1 | 1 | 1 | 1 |
| SC officers required | ALARM | 2 | 2 | 2 | 2 | 2 | 2 | 2 | 2 |
| AC damage | | 3 | 3 | 3 | 3 | 3 | 3 | 3 | 3 |
| Accident | | 4 | 4 | 4 | 4 | 4 | 4 | 4 | 4 |
| Breakdown | | 5 | 5 | 5 | 5 | 5 | 5 | 5 | 5 |
| Parking assignment accepted | CONFIRMATION | 6 | | | | | | 6 | |
| Bus for agents brought up | | 7 | | | | | | | |
| Moved to parking with agent | | 8 | | | | | | | |
| Moved to parking without agent | | 9 | | | | | | | |
| Arrived at parking | | 10 | | | | | | 10 | |
| Commencement of boarding of passengers to bus | INFORMATION | 11 | | | | | | | |
| Arrived at air terminal | | 12 | | | | | | | |
| Commencement of debussing of passengers | | 13 | | | | | | | |
| Debussing finished | | 14 | | | | | | | |
| Bus brought up to exit | | 15 | | | | | | | |
| Demurrage due to others’ fault (conflict situation) | DELAY | 16 | 16 | 16 | 16 | 16 | 16 | 16 | 16 |
| Ramp set up at parking | | | | | | | | 17 | |
| Ramp driven away | INFORMATION | | | | | | | 18 | |
| Ramp left at parking | | | | | | | | 19 | |
| Arrived at air terminal | | | | | | | | 20 | |
| Commencement of movement from parking to base | | | | | | | | 21 | |
| Assignment accepted, performing | CONFIRMATION | | 22 | 22 | 22 | 22 | 22 | | 22 |
| Arrived at parking, started loading | COMMENCEMENT | | 23 | | 23 | | | | |
| Loading completed | COMPLETION | | 24 | | 24 | | | | |

TABLE 1-continued

| Massage | Message status | Message codes by types of LBVs*) | | | | | | | |
|---|---|---|---|---|---|---|---|---|---|
| | | Bus (Neoplan) | Autoelevator (Ford 800) | Sanitaion vehicle | Supplier Ford Transit | Water filling vehicle | Refueller | Ramp (ABS 580) | Tractor |
| Arrived at parking, get down to refueling | COMMENCEMENT | | | | | 25 | 25 | | |
| Refueling completed | COMPLETION | | | | | 26 | 26 | | |
| Arrived at parking, get down to assignment | COMMENCEMENT | | | 27 | | | | | 27 |
| Assignment completed | COMPLETION | | | 28 | | | | | 28 |
| Commencement of operation | COMMENCEMENT | 30 | | | | | | 30 | |
| Completion of operation | COMPLETION | 31 | | | | | | 31 | |
| Obstacle removed | OBSTACLE REM. | 32 | 32 | 32 | 32 | 32 | 32 | 32 | 32 |

*) Empty boxes mean that vehicles of the given type do not send such massages

Figure 11:
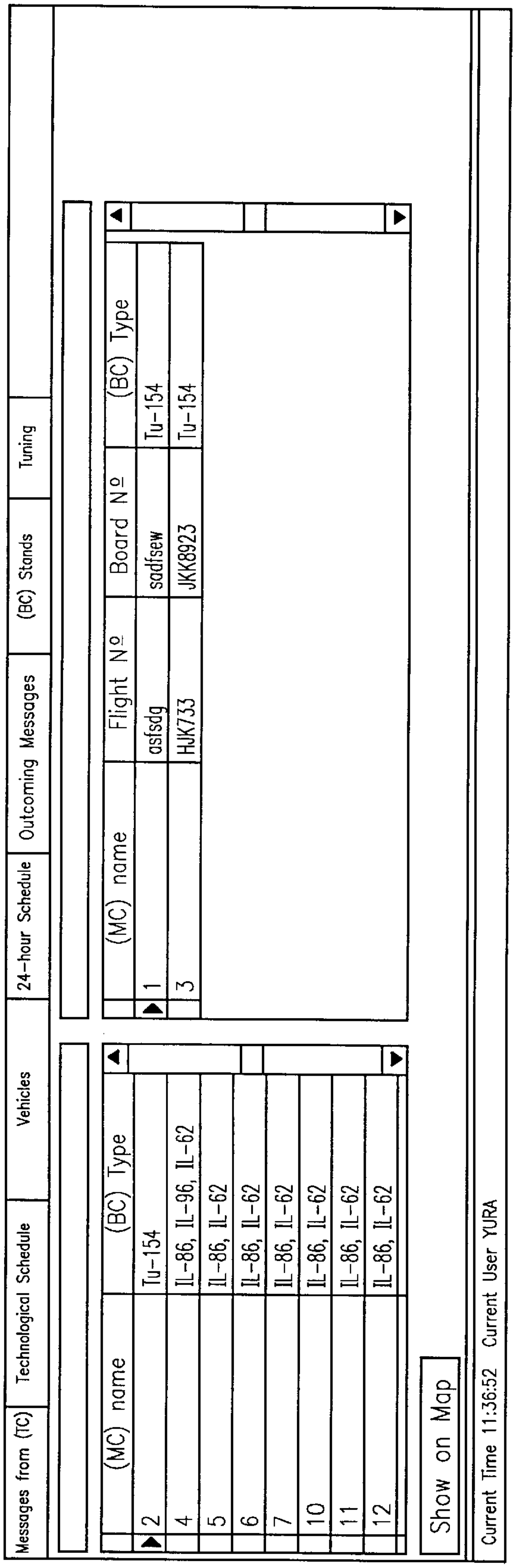
Figure 12:
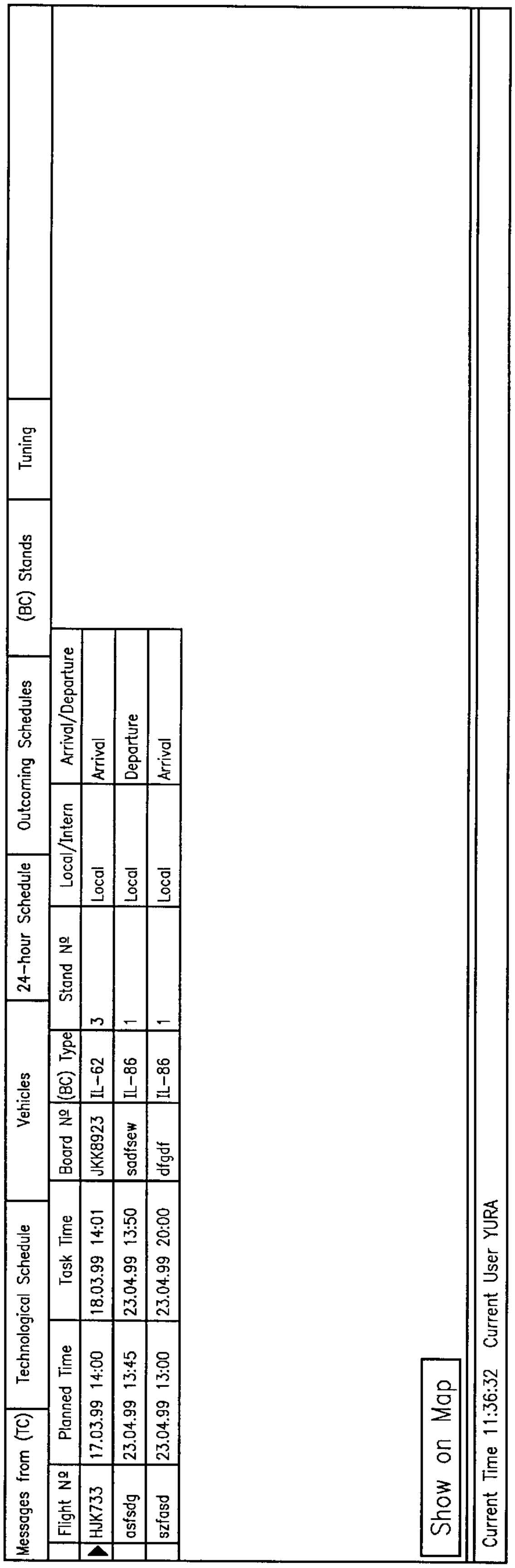
Figure 13:
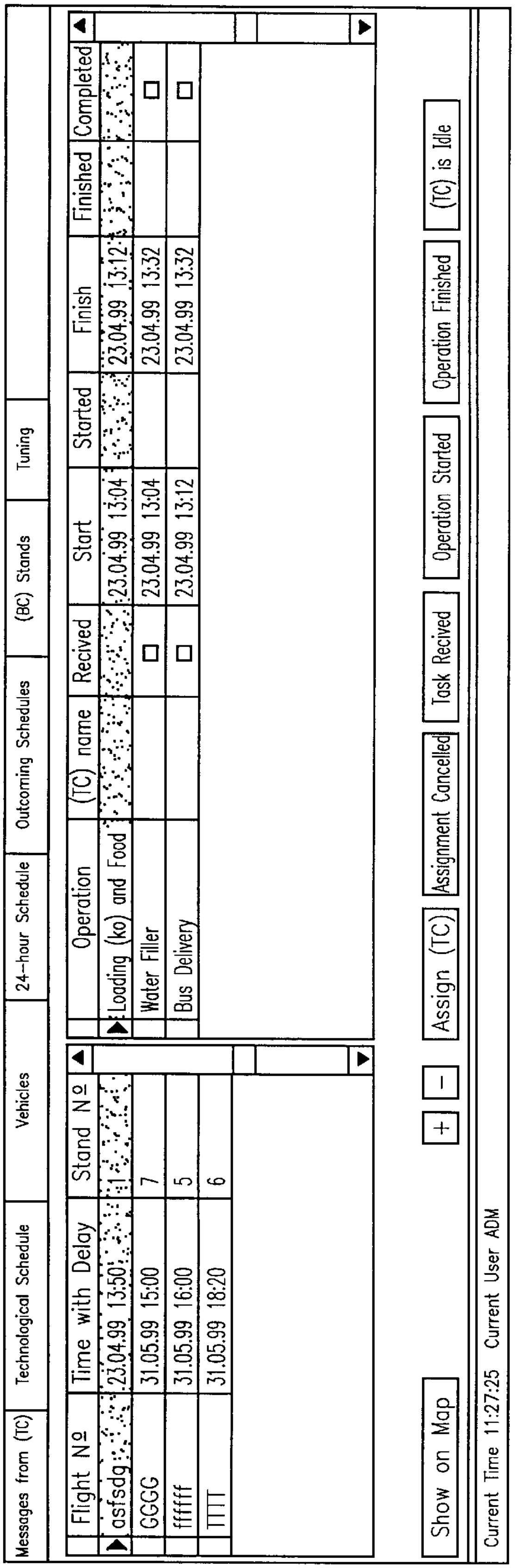

Arrival and departure;

7. Assignment of a Vehicle to Servicing a AC and Issuing Control Instructions to it Flights assigned to arrival/departure are displayed in the Oncoming Flights spreadsheet located in the application box to the right of the map (see FIG. 11).

Appearance of a flight in this table signals to the operator about a necessity to assign a vehicle for servicing this flight.

Figure 14:
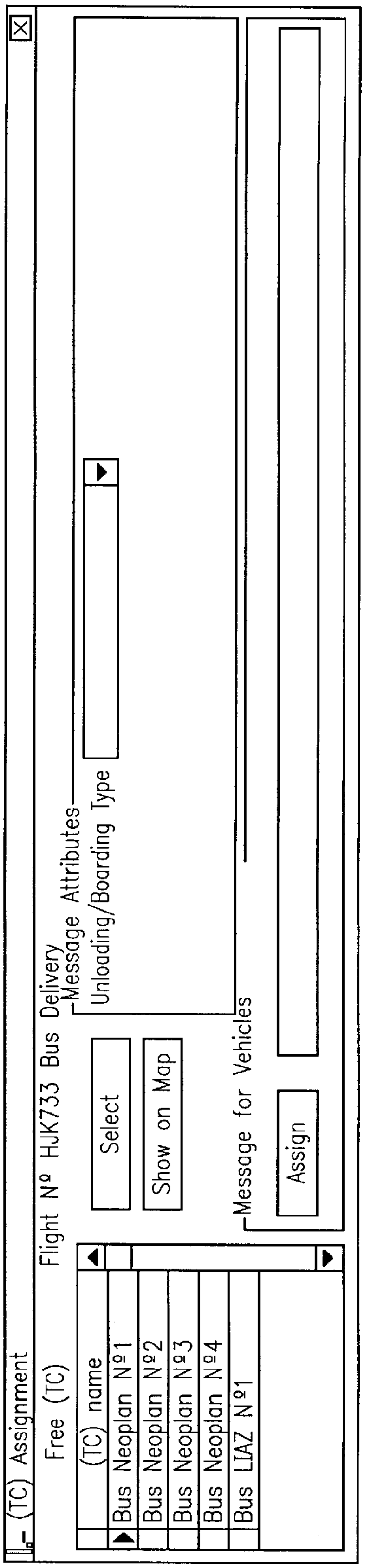

To assign a vehicle the operator selects the Technological Schedule bookmark (see FIG. 14).

Figure 15:
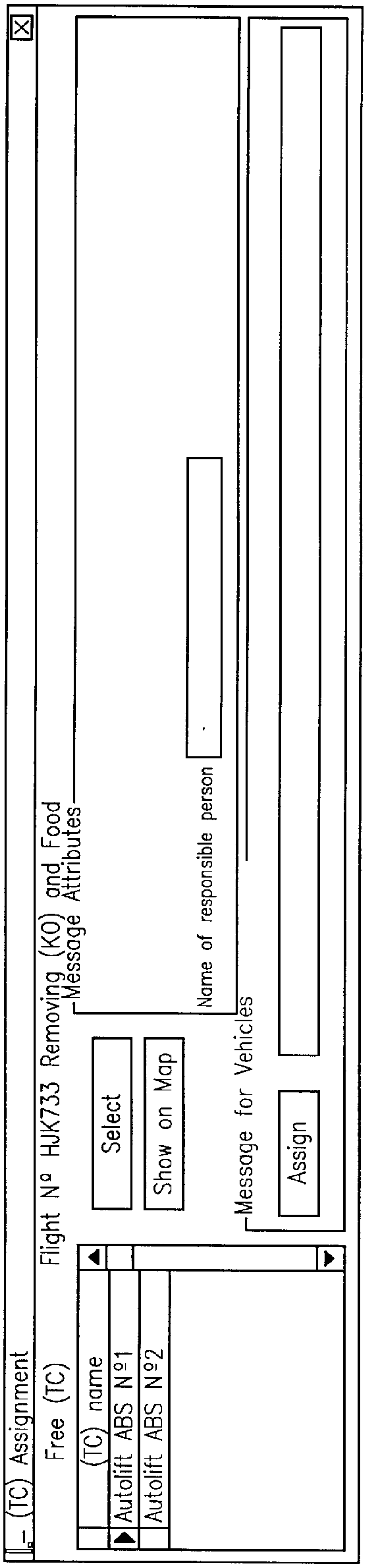
Figure 16:
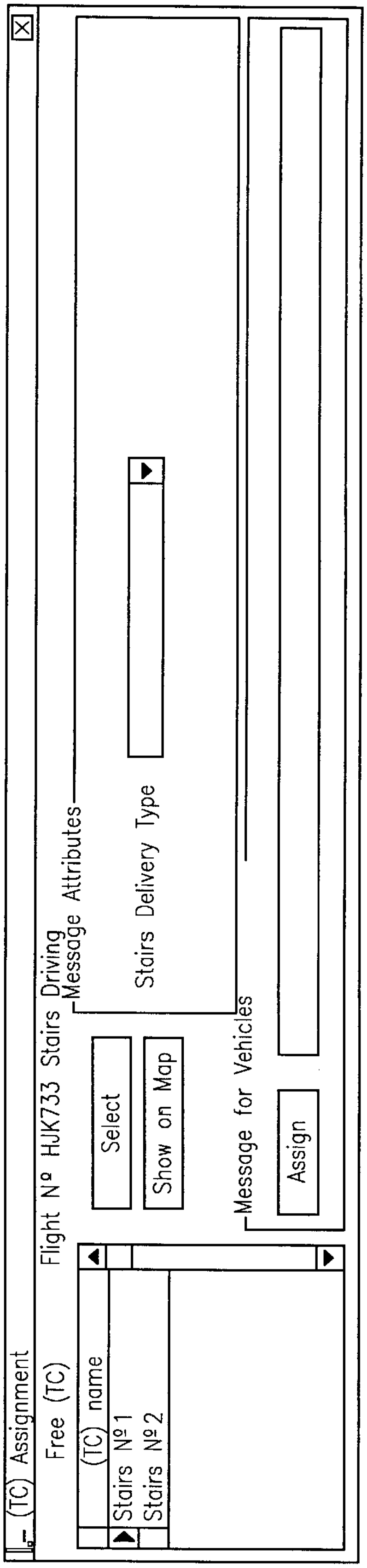
Figure 17:
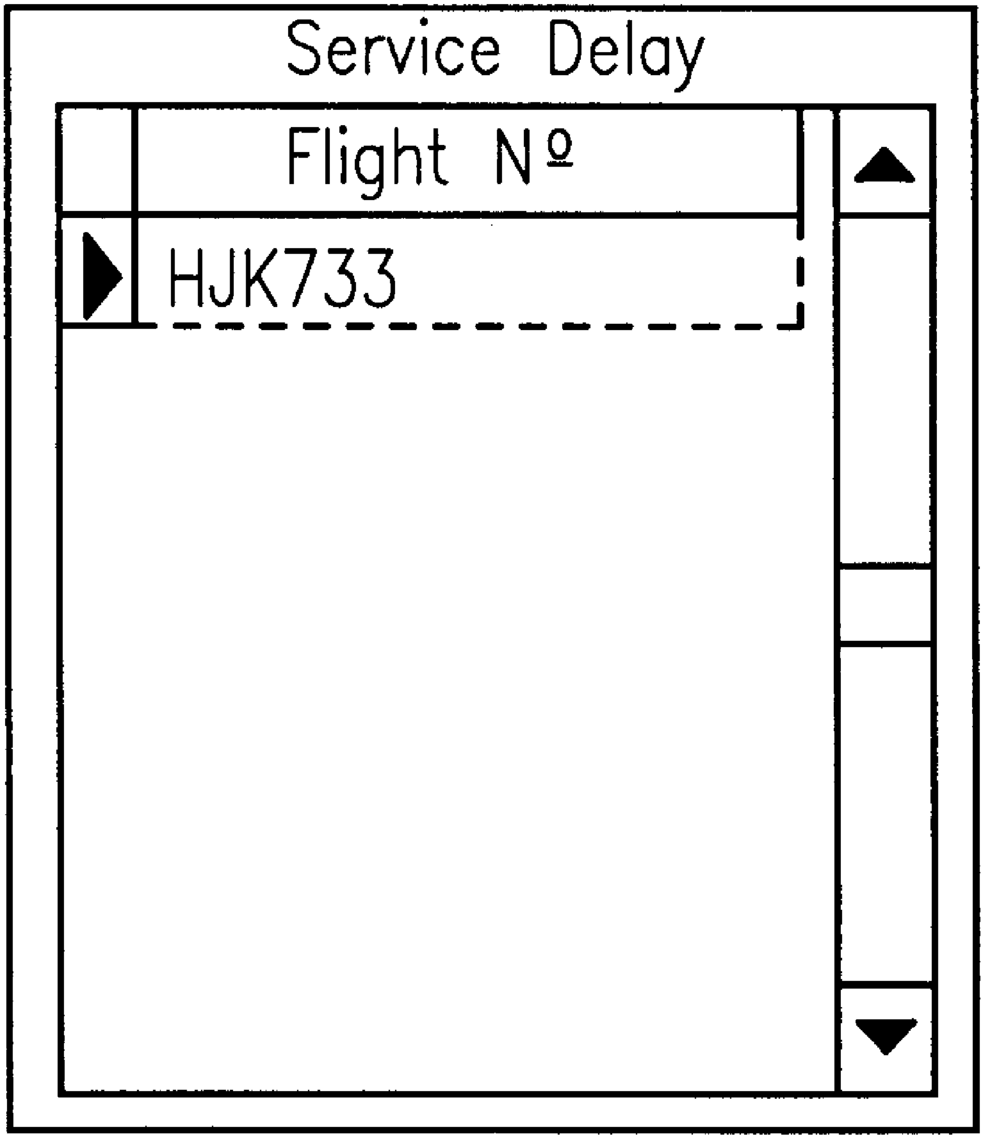

It shows a list of flights and parking spaces for which flight servicing is assigned. On selecting a flight and parking space, a list of works, time of their commencement and completion for the selected flight is displayed in the right part of the spreadsheet. Selection of a flight and opening of the Technological Schedule bookmark itself can be done by double-clicking the flight line in the Oncoming Flights spreadsheet. For each type of works the operator must assign a vehicle out of the list of permitted ones. To select a vehicle for an operation specified in the marked line of the right spreadsheet, the Assign Vehicle key should be clicked. The Assignment of Vehicle box will appear. Variants of this box for performance of different operations are represented here (see FIGS. 15, 16, 17).

A vehicle in the assignment box is selected in the left list. Selection is confirmed by clicking the Select key. The additional box in the Attributes of Message area allows circumstantiating performance of the technological operation by selecting a particular variant or entering additional information (composition of attributes depends on type of operation to be performed). Since a vehicle is selected a message will be shown on the screen. In some cases information inaccessible to the system should be inserted into it. A message is sent to the driver by clicking the Assign key.

In order to make substitution of a vehicle assigned for an operation possible the Assignment Canceled key is used on the Technological Schedule bookmark. After this key is clicked the fields of vehicle name and marks/time of commencement/completion of an operation are cleared in the selected line of the technological operations spreadsheet. After that a new assignment of a vehicle can be done.

If the vehicle crew confirms receipt of the assignment such vehicle will be marked (on the Technological Schedule bookmark) as assigned for the operation.

The flight for servicing of which the operator made all necessary assignments is deleted from the Oncoming Flights spreadsheet. Those flights for which a partial assignment is made or assignments of vehicles were canceled (the schedule is not formed completely) appear in the Assignment of Vehicle list (to the right of the scheme, second from the top). Naturally, the operator must also make assignments of vehicles for such flights.

8. Control of Execution of AC Servicing Technological Schedule by Different LBVs Execution of operations is displayed on the Technological Schedule bookmark. Since a vehicle crew has confirmed receipt of an assignment the Assigned mark appears in the spreadsheet line that corresponds to such operation.

After a message of commencement of work is received from a vehicle the operation status will be changed to "being performed".

On receipt of a message of completion of an operation from a vehicle the Completed mark appears in the spreadsheet line that corresponds to such operation. The operator uses the keys Assignment Accepted, Operation Commenced, Operation Completed, Demurrage of Vehicle below the Technological Schedule bookmark to define for the system a status of execution of technological operations in an alternative way.

Such method is used in cases where for some reason a massage from a vehicle was not received in the ordinary way, namely over a radio channel to the server, and the operator received reliable information about state of a vehicle over other (voice) communication channels.

The system controls timeliness of arrival of messages from vehicles or their imitation made by the operator. In case of their absence at a predefined moment, a flight number will appear in the Servicing Delays spreadsheet on the Flight Servicing bar. The fact of appearance is accompanied by a sound signal.

The technological schedule for works being performed shows delay in commencement/completion of work as compared to the scheduled time. The system controls facts of non-observance of the technological schedule and shows flight numbers in respect of which such non-observance takes place in the Servicing Delays spreadsheet to the right of the map (see FIG. 16).

Double-click of the left mouse key on a line in this spreadsheet opens the Technological Schedule bookmark and shows operations of the appropriate flight in its right spreadsheet.

9. Procedures in Case of System Operation Failure

In case of non-serviceability of the dispatcher station program the operator should address the system administrator or perform a sequence of actions assigned by him.

What is claimed is:

1. A method of real-time tracking and management of land-based vehicles (LBVs) of the airport, said method comprising:

forming of a geoinformation system of the airport territory that provides for reflection of at least one of current situation, real-time determination of coordinates of vehicles using satellite positioning devices, control of speed and routes of LBVs and arrangement of LBV traffic, controlling of at least one of state of LBVs and time of execution of works by each vehicle and control of movement and execution of works by LBVs by at least one of transmitting messages from and to LBVs in at least one of an interactive mode and in a formalized mode in accordance with the time technological schedule of postflight servicing of aircrafts on the basis of the daily plan of flights, the geoinformation system of the airport territory being formed in two-dimensional coordinates, and vehicle coordinates being determined in relative geographic coordinates.

2. The method of claim 1, wherein control of at least one of state and determination of vehicle coordinates using satellite positioning devices is carried out by way of periodic inquiry, and data obtained are transferred to the central database of the dispatcher center for subsequent storage, analysis and process.

3. The method of claim 1, wherein control of state of vehicles includes at least one of turn-on/turn-off of ignition, opening/closing of doors, lifting/lowering of elevators to a predetermined height, cargo weight, AC board contact, entry/withdrawal from the works execution area, volume of fuel and water during fueling AC, contact of a LBV with the front leg of the undercarriage of an AC, crippling of vehicle-borne equipment of LBVs, distance to an object and integrity of cargo packing.

4. The method of claim 1, wherein there is additional control of an abnormal situation and reaction of at least one of drivers of and devices of vehicles.

5. The method of claim 4, wherein at least one breakdowns, fire and terrorist attacks are taken into account in controlling an abnormal situation.

6. The method of claim 2, wherein at least one transmission of messages from and to vehicles and receipt of data about at least one of state and coordinates of vehicles is carried out over a dedicated digital channel.

7. The method of claim 1, wherein the geoinformation system of the airport territory is formed in a multi-level structure.

8. The method of claim 7, wherein the multi-level structure of the geoinformation system of the airport territory includes the airport surface, underground communications, overground objects, scheme of arrangement and organization of traffic LBVS, special transports and carriers.

9. The method of claim 1, wherein the geoinformation system of the airport territory is represented as a digitalized map with scale change elements.

10. The method of claim 1, wherein while controlling vehicles, routes of vehicle movement are defined using heuristic methods with a possibility of their further optimization.

11. The method of claim 1, wherein location of vehicles on the geoinformation system of the airport territory is visualized by way of icons.

12. The method of claim 1, wherein at least one of the GPS and GLONASS systems are used as satellite positioning devices.

13. A method of real-time tracking and management of land-based vehicles (LBVs) of the airport, said method comprising:

forming of a geoinformation system of the airport territory that provides for reflection of at least one of current situation, real-time determination of coordinates of vehicles using satellite positioning devices, control of speed and routes of LBVs and arrangement of LBV traffic, controlling of at least one of state of LBVs and time of execution of works by each vehicle and control of movement and execution of works by LBVs in accordance with time technological schedule of postflight servicing of aircrafts on the basis of the daily plan of flights, the geoinformation system of the airport territory being formed in two-dimensional coordinates, and vehicle coordinates being determined in relative geographic coordinates, and controlling of state of vehicles includes at least one of control of turn-on/turn-off of ignition, opening/closing of doors, lifting/lowering of elevators to a predetermined height, cargo weight, AC board contact, entry/withdrawal from the works execution area, volume of fuel and water during fueling AC, contact of a LBV with the front leg of the undercarriage of an AC, crippling of vehicle-borne equipment of LBVs, distance to an object and integrity of cargo packing.

14. A method of real-time tracking and management of land-based vehicles (LBVs) of the airport, said method comprising:

forming of a geoinformation system of the airport territory that provides for reflection of at least one of current situation, real-time determination of coordinates of vehicles using satellite positioning devices, control of speed and routes of LBVs and arrangement of LBV traffic, controlling of at least one of state of LBVs and time of execution of works by each vehicle and control of movement and execution of works by LBVs in accordance with time technological schedule of postflight servicing of aircrafts on the basis of the daily plan of flights, the geoinformation system of the airport territory being formed in two-dimensional coordinates, and vehicle coordinates being determined in relative geographic coordinates, and forming the geoinformation system of the airport territory in a multi-level structure.

15. The method of claim 14, wherein the multi-level structure of the geoinformation system of the airport territory includes the airport surface, underground communications, overground objects, scheme of arrangement and organization of traffic LBVs, special transports and carriers.

16. A method of real-time tracking and management of land-based vehicles (LBVS) of the airport, said method comprising:

forming of a geoinformation system of the airport territory that provides for reflection of at least one of current situation, real-time determination of coordinates of vehicles using satellite positioning devices, control of speed and routes of LBVs and arrangement of LBV traffic, controlling of at least one of state of LBVs and time of execution of works by each vehicle and control of movement and execution of works by LBVs in accordance with time technological schedule of postflight servicing of aircrafts on the basis of the daily plan of flights, the geoinformation system of the airport territory being formed in two-dimensional coordinates, and vehicle coordinates being determined in relative geographic coordinates, and representing the geoinformation system of the airport territory as a digitalized map with scale change elements.

17. A method of real-time tracking and management of land-based vehicles (LBVs) of the airport, said method comprising:

forming of a geoinformation system of the airport territory that provides for reflection of at least one of current situation, real-time determination of coordinates of vehicles using satellite positioning devices, control of speed and routes of LBVs and arrangement of LBV traffic, controlling of at least one of state of LBVs and time of execution of works by each vehicle and control of movement and execution of works by LBVs in accordance with time technological schedule of postflight servicing of aircrafts on the basis of the daily plan of flights, the geoinformation system of the airport territory being formed in two-dimensional coordinates, and vehicle coordinates being determined in relative geographic coordinates, and defining, while controlling vehicles, routes of vehicle movement using heuristic methods with a possibility of their further optimization.

* * * * *

UNITED STATES PATENT AND TRADEMARK OFFICE

CERTIFICATE OF CORRECTION

PATENT NO. : 6,415,219 B1
DATED : July 2, 2002
INVENTOR(S) : Degodyuk

It is certified that error appears in the above-identified patent and that said Letters Patent is hereby corrected as shown below:

Title page,
Item [73], Assignee, please change "Zakrytoye East Line-Handling" to -- Zakrytoye Aktsionernoye Obschestvo East Line-Handling --; and change "Domodedoxo" to -- Domodedovo --.

Signed and Sealed this

Ninth Day of September, 2003

JAMES E. ROGAN
*Director of the United States Patent and Trademark Office*